United States Patent [19]

Sparks

[11] 4,132,282
[45] Jan. 2, 1979

[54] AUTOMOTIVE ELECTRIC GENERATOR

[76] Inventor: Keith L. Sparks, 2912 Abigail Dr., Louisville, Ky. 40205

[21] Appl. No.: 759,998

[22] Filed: Jan. 17, 1977

[51] Int. Cl.² .............................................. B60K 1/00
[52] U.S. Cl. .................................. 180/65 DD; 322/1
[58] Field of Search ........... 180/65 R, 65 DD; 322/1; 320/2; 290/44, 55

[56] References Cited

U.S. PATENT DOCUMENTS

| 3,473,038 | 10/1969 | Hakkarinen | 290/44 |
| 3,876,925 | 4/1975 | Stoeckert | 180/65 X |

Primary Examiner—Joseph F. Peters, Jr.
Assistant Examiner—Gene A. Church
Attorney, Agent, or Firm—Edward M. Steutermann

[57] ABSTRACT

The present invention provides an arrangement for use in a battery powered automotive vehicle and more particularly provides a means utilizing wind currents for generation of electric power, for use in connection with an electric motor driven vehicle, including: rotatable impeller means responsive to flow of air and mounted for rotation about a vertical axis where the impeller is carried on the surface of the electric motor driven vehicle; a power shaft cooperatively connecting an electric generator means and the impeller for generation of electric energy to be supplied to an electric storage battery means; and an electric motor to drive the vehicle; air guide means to direct air streams to the impeller to optimize efficiency in rotation of the impeller in one direction when the vehicle is proceeding in a selected direction and rotation of the impeller when the vehicle is at rest.

9 Claims, 6 Drawing Figures

AUTOMOTIVE ELECTRIC GENERATOR

BACKGROUND OF THE INVENTION

Various prior arrangements have been provided utilizing wind currents for generating electric power for electrically driven automobiles. In some arrangements, rotor assemblies and electric generators have been provided for use in electrically powered vehicles where the air currents passing by or through the vehicle have been used to generate electricity to be retained in an electric storage battery arrangement to supplement the power provided to the battery from outside sources.

One such previous device, as shown in U.S. Pat. No. 3,621,930, is adapted to be carried on the roof of an automobile but is activated only by motion of the vehicle and does not provide means to take advantage of the air currents when the vehicle is at rest inasmuch as the disclosed arrangement is not adapted to take maximum advantage of ambient air currents when the vehicle is at rest.

Another such arrangement is shown in U.S. Pat. No. 3,876,925.

Moreover, such previous devices have in many cases been provided with air duct means to selectively conduct the air stream passing over the vehicle to the impeller whereby the resistance to flow of the air stream is increased and the efficiency of the apparatus is decreased accordingly.

Another previous device, as shown in U.S. Pat. No. 3,556,239, provides fluid flow driven impulse drive means disposed within the vehicle for rotation about a horizontal axis where an air stream is provided to an air duct to direct the air stream through the vehicle to the rotor which, likewise, is rotated in response to movement of the air current through a cooperative housing in response to motion of the vehicle in a forward direction.

Other previous devices, as shown in U.S. Pat. Nos. 3,743,848 and 3,707,812, have disclosed various arrangements for rotation of an impeller about a vertical axis but the devices are adapted specifically for use in connection with a stationary power plant to generate electricity at a stationary location.

SUMMARY OF THE INVENTION

The present invention provides an advantageous arrangement to generate electrical energy for use in an electric motor driven vehicle including an electric storage battery means to supply electrical power to drive the electric motor. In most electrically driven vehicles, the principal source of electric energy is received from an external source where the battery is charged periodically and the vehicle is driven until it is necessary to recharge the battery. The present invention provides an arrangement which is particularly useful to take advantage of air currents, even when the vehicle is at rest, to provide supplemental electrical energy to the electric storage battery arrangement during operation of the vehicle between the periods when the battery is recharged from the external source and increase the range of an electrical vehicle.

The present invention further provides a useful and advantageous arrangement where electrical energy can also be provided to the storage battery during the period when the vehicle is at rest as a result of ambient air currents flowing past the vehicle to rotate the impeller and generate electricity to be received by the storage battery.

More particularly, the present invention provides an arrangement for generation of electricity for electrically powered vehicles including rotatable impeller means mounted for rotation about a vertically disposed axis which can be adapted to be carried on the roof of an electric power driven vehicle where the impeller drives a generator to provide power to an electric motor adapted to power the auto, an electric storage batter arrangement is provided to receive electrical energy from external sources and from power generated by rotation of the generator and provide electric energy to said motor means. In accordance with one feature of the present invention, the rotor can be adapted for optimum efficiency when the vehicle is proceeding in a selected direction and is further adapted to provide optimum efficiency for rotation in response to air currents from any direction when the vehicle is at rest.

BRIEF DESCRIPTION OF THE DRAWINGS

Referring now to the drawings which show one example of an arrangement in accordance with the present invention;

FIG. 3A is a view of one example of an impeller and louvered cage arrangement in accordance with the present invention taken along a line 3—3 of FIG. 2;

Figure 1:
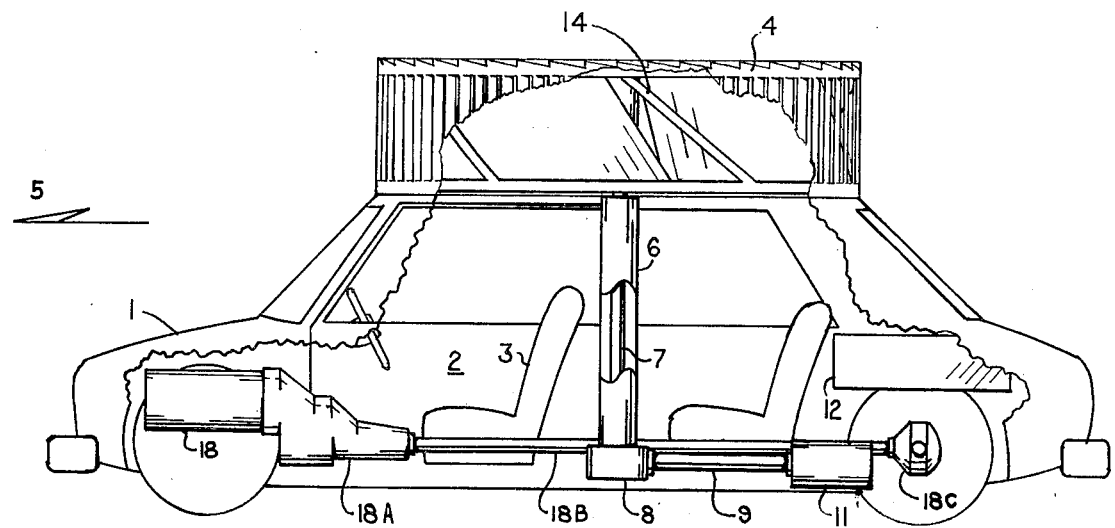
FIG. 1 is an elevational view, partly in section, showing a vehicle arrangement in accordance with the present invention.

Referring first to FIG. 1, a power generator in accordance with the present invention, described hereinafter, can be adapted for use in connection with a vehicle 1, which is powered by an electric motor 18 located in a forward compartment of the vehicle. The vehicle can include a passenger compartment 2 adapted, as is commonly known, to receive seats 3 for seating passengers carried by the vehicle. In accordance with the example with the present invention shown in the drawings, a rotatable impeller 14 is disposed on the roof of the vehicle for rotation about a vertical axis. A louvered impeller cage 4 is provided to surround rotor 14 and extend upwardly from the roof of vehicle 1 as shown.

An electric storage battery 12 can be secured in a rear compartment of vehicle 1 to receive electric energy generated by rotation of generator 11 also located in vehicle 1.

Figure 2:
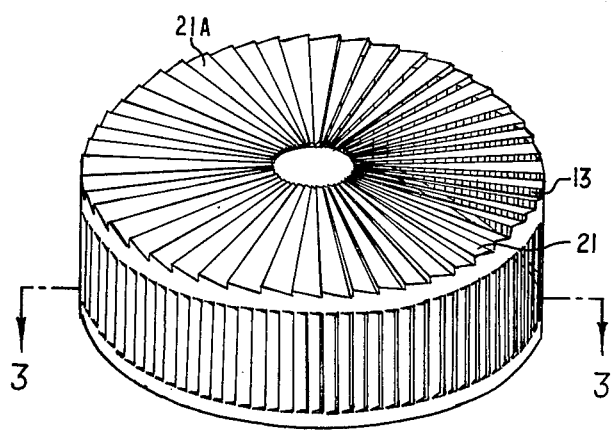
FIG. 2 is a partially exploded, partly schematic, view of one impeller arrangement in accordance with the present invention.
Figure 2:
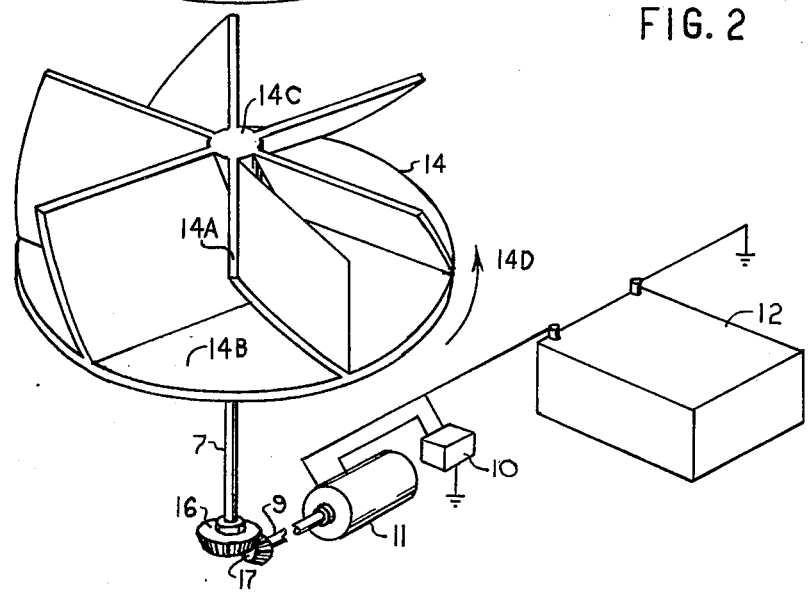

A rotatable vertical shaft 7 is connected to rotor 14 to be rotated in response to rotation of impeller 14 as described hereafter. As shown a mitred differential gear mechanism can be provided including first and second bevel gears 16 and 17 as shown in FIG. 2, and located in housing 8 as shown in FIG. 1, to transmit the rotation of vertical shaft 7 to a horizontal power shaft 9 which is connected to generator 11. Generator 11, is provided to supply electric energy to a storage battery 12, as described more particularly hereinafter.

Vehicle 1 can be provided with a drive arrangement, as shown, including an electric motor 18, which can be located in the front of vehicle 1 to receive electric current from generator 11 and/or battery 12. Motor 18 can be connected to a transmission 18A which rotates a drive shaft 18B connected to a differential drive 18C which transmits power to the rear wheels of vehicle 1.

Referring again to FIG. 2, which shows an exploded partly schematic view of the generator arrangement shown in FIG. 1, it will be seen that rotor 14 can include spaced vanes 14A which can have a selectively curved cross section where vanes 14A are carried by a base 14B. Generator shaft 7, as previously described is connected to bevel gear 17 to provide a power transmission arrangement. Bevel gears 16 and 17 can advantageously be of a selected diameter and configuration to provide any necessary step up or step down, in speed or rotation of shaft 9 to provide sufficient torque for rotation of generator 11. Upon rotation of generator 11, an electric current is generated, and where generator 11 is adapted to provide an alternating or direct current to battery 12. (Upon rotation of generator 11, an electric current, which can be a direct current is generated. The output from the generator can advantageously be regulated by a regulator 10 to provide a selected current of generally uniform voltage to battery 12 as shown.) Battery 12 can be selected to provide a maximum electrical storage to volume ratio for maximum efficiency in the application chosen, that is the operation of an electric powered motor driven vehicle.

It will be understood that arrangements, well known in the art but not shown, can be provided to periodically connect a source of external electrical energy to battery 12 necessary for operation of the vehicle. It is to be understood that, as is well known in the art, battery 12 is adapted to be connected to such external source of electricity.

Battery 12 is connected to motor 18 which provides the source of power for operation of the vehicle.

Referring now to FIG. 3A which shows a cutaway section of impeller cage 4 surrounding rotor 14. It will be noted that louvers 19 are provided around the periphery of the cage extending in a generally vertical direction. In the horizontal cross-section vanes 19 are advantageously inclined at an angle with respect to radius lines of rotor 14 to provide openings between vanes 19 for admission of air to the chamber 28 defined by the outer periphery of the cage and the top 21 of the case as shown in FIG. 2. The direction of motion of the vehicle is shown by the arrow 5. The flow of air through cage 4 is shown by air streams 25, 25A which enter cage 4 on the right side of the longitudinal axis of cage 4 between louvers 19 while the vanes to the left side of the axis prevent admission and in fact, an air stream 25D, can be emitted from cage 4 on the left side of cage 4.

Thus the louvered cage advantageously directs air selectively to rotor 14 when vehicle 1 is moving in a selected direction, and provides means to restrict the entry of air and for emission of air which would adversely affect the rotation of rotor 14. It will be noted that in the arrangement shown air stream 25C flowing past the left side of cage 4 will provide a venturi effect with respect to the openings between louvers 19 to assist in removal of air from cage 4.

In accordance with another feature of the present invention, it will be noted that when the vehicle is not moving in the direction indicated by arrow 5 the entire periphery of cage 4 is open for admission of ambient air to provide for rotation of impeller 14 when vehicle 1 is at rest.

In accordance with another feature of the present invention, referring to FIG. 2, it is recognized that cage 4 can be provided with louvers 21 over the top surface of the cage where apertures 13 are provided between the vanes 21 so as vehicle 1 moves in the selected direction represented by arrow 5 an air stream is admitted through openings 13 to provide additional air currents for rotation of rotor 14. Likewise, on the opposite side of the top surface of shroud 14 air currents pass over vanes 21A resulting in a venturi effect which withdraws air from the top of the enclosure formed by cage 4 so that the efficiency of the operation of rotor 14 is further improved.

Figure 3B:
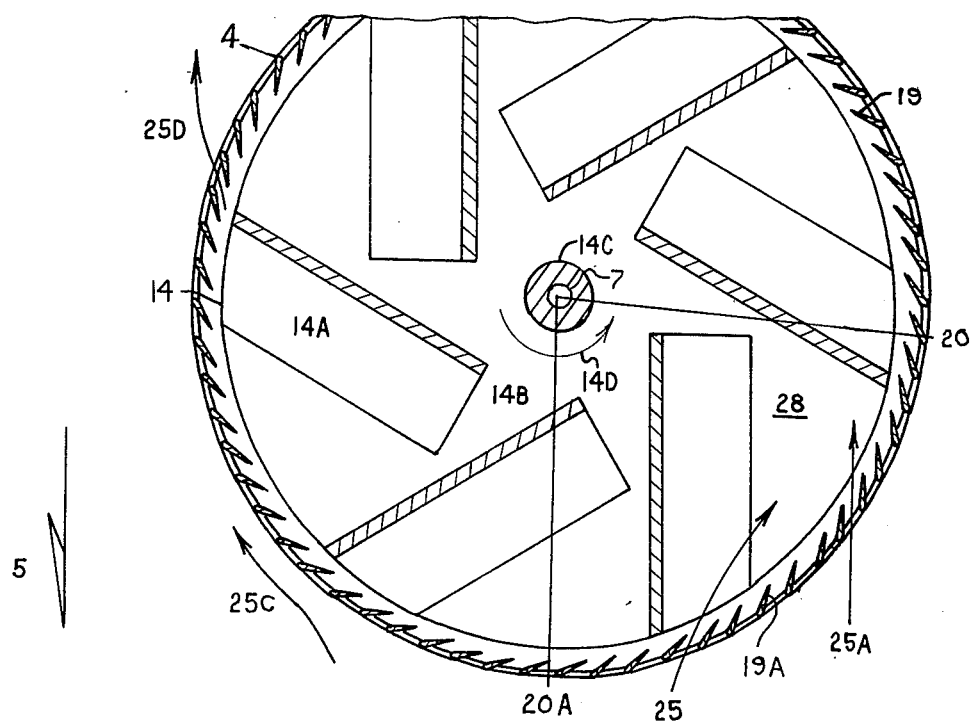
FIG. 3B is a view taken along line 3—3 of FIG. 2 showing another example of an impeller and louvered cage arrangement in accordance with the present invention.
Figure 3B:
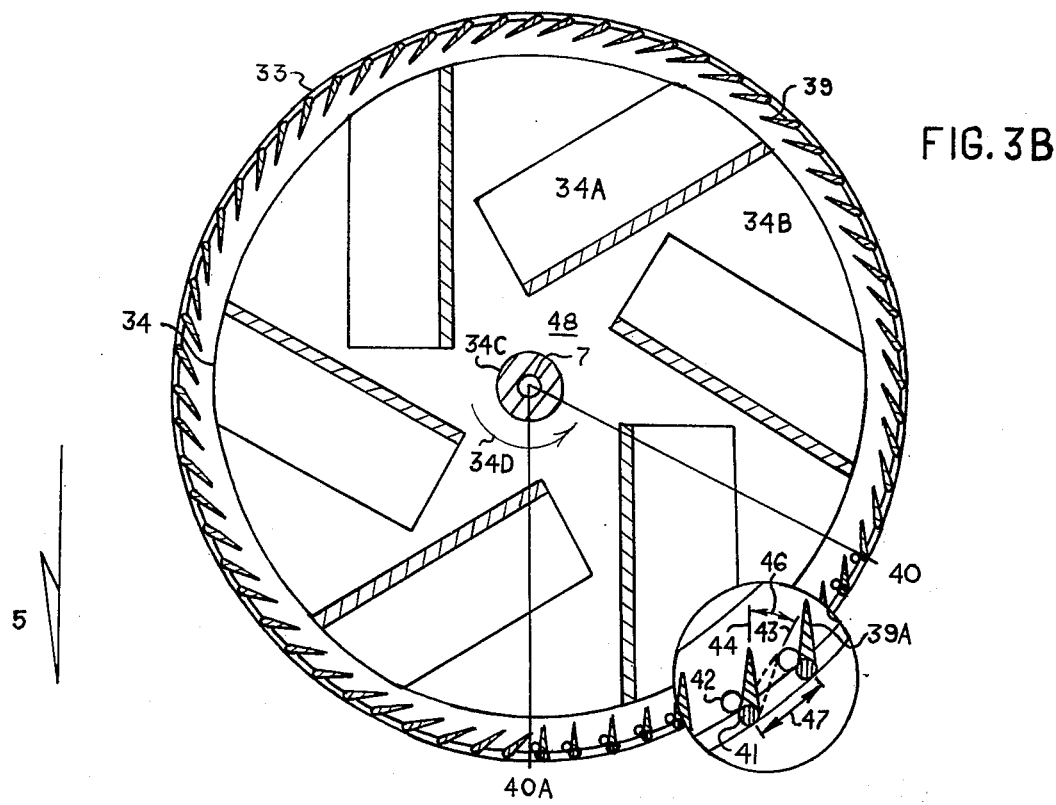

In the example shown in FIG. 3B rotor 34 is carried by shaft 7 and includes rotor blades 34A secured to rotor 34B which extend from the edge of rotor 34B inwardly, but not radially, across rotor 34 and define a generally annular gas flow area 48 surrounding shaft 14C.

A ring 33 is provided to receive vanes 39–39A to form an impeller cage and surround rotor 34 from back side.

As shown, the vanes 39A within segment 40–40A of ring 33 are pivotably mounted on posts 41 to pivot from position 44 where an opening 47 is defined between adjacent blades 39A, where stops 42 are provided to limit movement of vanes 39A to a position 43 shown in broken lines where opening 47 is narrowed so each vane 39A moves through a selected angle 46 in response to air flow as hereinafter described. The segment 40–40A of pivotable vanes 39A is advantageously located to receive air currents caused by movement of the impeller cage in the direction shown by arrow 5.

The remainder of the vanes 39 can be fixed on ring 33.

Figure 4:
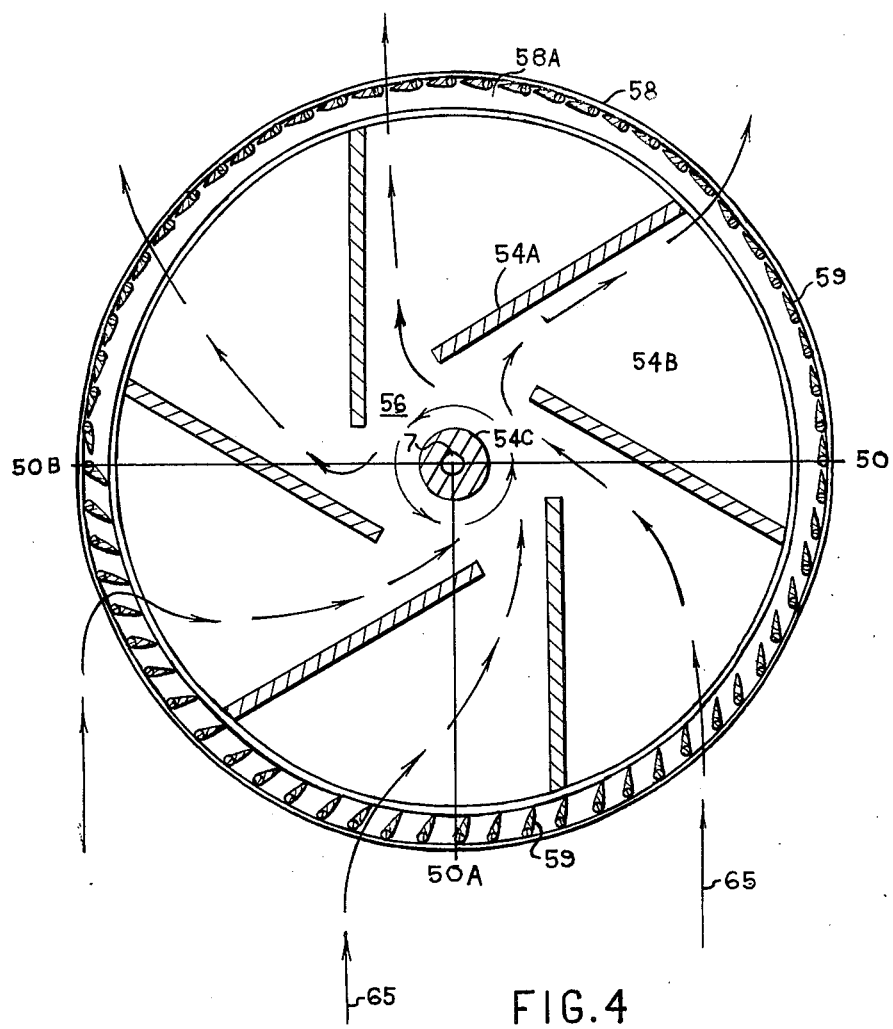
FIG. 4 is a schematic illustration of air flow through another arrangement in accordance with the present invention.
Figure 5:
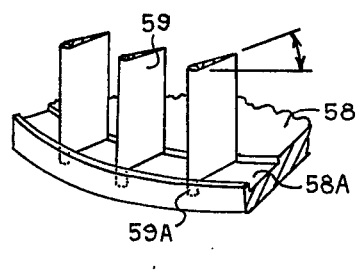
FIG. 5 is a partial view of one example of a pivotable van impeller cage in accordance with the present invention.

FIG. 4 is an illustration of an alternative arrangement for moutning pivotable blades 59 in a ring 58 where as shown in FIG. 5 a groove 58A is cut in ring 58 to receive the ends of vanes 59 and each vane 59 is provided with an arm 59A to be received in a cooperative journal adjacent the outer edge of groove 58A as shown. The angle through which vanes 59 pivot is determined by the width of groove 58A as shown.

In the example all of the vanes 59 are pivotable and the position of the vanes depends on the direction of air current entering th impeller cage.

A rotor 54 is provided to rotate shaft 7 where vanes 54A are carried by rotor 54.

In operation of the device shown in FIG. 3B the principal air current enters the impeller cage between vanes 39A where the vehicle, to which the impeller is attached moves in the direction indicated by arrow 5. The air rotates rotor 47 and is emitted through the openings defined between blades 39.

When the vehicle is at rest, air currents can enter the impeller cage through any of the openings defined between vanes 39 or 39A to rotate impeller 34 to turn shaft 7 to generate electrical energy for storage battery 12 as previously described.

In operation of the arrangement shown in FIG. 3A, fixed blades 19A are uniformly inclined relative to longitudinal lines of ring 4 to permit maximum air flow to rotor 14 when the impeller cage is moved in the direction indicated by arrow 5.

In operation of the arrangement shown in FIG. 4, blades 59 of ring 58 are pivotable around the entire periphery of the ring so that regardless of the direction of air flow the quadrant of the blades most effective for rotation of impeller 54 are open. For example, in the Figure shown, where entering air flow is as shown by arrows 65, blades 59 between lines 50–50A are inclined to permit virtually straight in air flow while the blades between lines 50A–50B are inclined to direct the incoming air stream in the direction of rotation of impeller 54. Blades 59 between lines 50 and 50B are closed except for the spaces advantageously provided between the blades to permit exhaust of the air stream.

In the rotors shown, for example rotor 54 of FIG. 4, it will be noted that blades 54A are adapted to provide an annular area 56 between the inner edges of the blades 54A and rotor shaft 14C to permit exhaust air flow off the ends of the blades so that on the reverse side of the blades in the two quadrants between lines 50–50B the blades impell exhaust air from the impeller cage.

Various other embodiment of the present invention will become obvious to those skilled in the art upon reading the disclosure hereinbefore and it will be understood that the scope of the present invention is limited only by the closing appended hereto.

The invention claimed is:

1. In an electric motor driven vehicle, including an electric motor adapted to provide motive power to drive said vehicle and electric storage battery means to provide electric current to said motor, an arrangement to provide electric current to the battery including:
    (a) fluid flow responsive impeller means rotatably carried in a generally horizontal plane about a central generally vertical axis of rotation for rotation in a generally horizontal plane in response to air flow wherein said impeller means is of generally circular shape having a plurality of spaced vanes to rotate said impeller means in response to flowing air contacting said vanes;
    (b) generally vertical shaft means carried by said impeller means for rotation by said impeller means;
    (c) cage means stationary with respect to said impeller means located in spaced relation therefrom, to define a chamber to receive said impeller means, wherein said cage means includes a plurality of generally parallel spaced vertically disposed flat air directing cage louvers physically defining the exterior boundary of said cage means, where said cage louvers define air flow conduits therebetween so as to admit a multiplicity of air streams to said impeller means to rotate said impeller means where said louvers are disposed with one side to direct air flow disposed at a selected attitude relative to a tangent line of the periphery of said cage to direct air flowing therethrough to rotate said impeller means, and where a selected number of said cage louvers, lying consecutively along a portion of the periphery of said cage means are individually attitudinally disposed irrespective of ambient wind of vehicular direction, at different angles, which when measured relative to a tangent to said cage means drawn at the locus of an individual cage louver, is less than ninety degrees, and where the attitudinal disposition of a first portion of said cage louvers defining flow paths therebetween to admit a first portion of an air stream to said impeller means to rotate said impeller means in a selected direction;
    (d) electric generator means mechanically connected for rotation by said shaft means to generate electric current for said electric motor.

2. The invention of claim 1 wherein a second portion of said cage louvers lying consecutively along a portion of the periphery of said cage means, are individually attitudinally disposed to deflect a second portion of said air stream around said cage to prevent admission of air to said cage means.

3. The invention of claim 2 wherein said second portion of said cage louvers are individually attitudinally disposed to form air flow paths therebetween for emission of air from said cage means and wherein said air stream flows between louvers of said second portion of said louvers.

4. The invention of claim 1 wherein said cage means is provided with generally horizontal top means disposed in spaced relation above said impeller means and where aperture means are provided in said top means to allow flow of air with respect to said cage means.

5. The invention of claim 4 wherein said top means includes spaced, inclined top louver means extending radially outwardly from the central portion of said top means in spaced relation to define said aperture means therebetween.

6. The invention of claim 5 wherein said top louver means are disposed to define openings when said cage means is moved in selected direction to admit air to said cage means across a first portion of said top means and to emit air from said cage means across a second portion of said top means.

7. The invention of claim 1 wherein said impeller means includes generally circular rotatable base means with multiple generally vertically extending spaced blade means wherein said blade means have a first edge located near the center of the base means and extend generally radially outwardly from the center of the base means toward the periphery of the base means and wherein gas receiving chambers are defined between consecutive blade members.

8. The invention of claim 7 wherein said first edges of said blade members are located in spaced relation about the center of said base member so a portion of the gas receiving chambers defined by the blade members are in mutually communicative relation at the center of said base member.

9. The invention of claim 1 wherein a portion of said cage louvers continously forming the periphery of said cage means and defining the sidewalls of said cage means are pivotably carried by said cage means such that said cage louvers can be selectively and individually oriented at various angles in response to direction of air flow to said cage means.

* * * * *